United States Patent [19]
Pratt

[11] Patent Number: 5,756,160
[45] Date of Patent: May 26, 1998

[54] SURFACE PROTECTION FOR CARBON COMPOSITE MATERIALS

[75] Inventor: Wilson N. Pratt, Anaheim, Calif.

[73] Assignee: Hughes Aircraft, Los Angeles, Calif.

[21] Appl. No.: 174,917

[22] Filed: Mar. 28, 1988

[51] Int. Cl.$^6$ ............................................. B05D 7/24
[52] U.S. Cl. ................................ 427/397.7; 427/397.8; 428/408
[58] Field of Search ......................... 427/397.7, 397.8; 428/408

[56] References Cited

U.S. PATENT DOCUMENTS

| | | | |
|---|---|---|---|
| 3,940,516 | 2/1976 | Gierek et al. | 106/18.25 X |
| 4,022,585 | 5/1977 | Kaye | 428/551 |
| 4,179,535 | 12/1979 | Kalbskopf et al. | 427/206 |
| 4,284,664 | 8/1981 | Rauch, Jr. | 427/180 |
| 4,461,806 | 7/1984 | Ikeda et al. | 428/408 |
| 4,465,777 | 8/1984 | Shuford | 501/88 |
| 4,471,023 | 9/1984 | Shuford | 428/408 |
| 4,567,103 | 1/1986 | Sara | 428/408 |
| 4,592,808 | 6/1986 | Doubt | 204/20 |

*Primary Examiner*—Daniel J. Jenkins
*Attorney, Agent, or Firm*—Charles D. Brown; Wanda K. Denson-Low

[57] ABSTRACT

The present invention comprises a method for protecting carbon composite materials from edge or surface damage during handling and manufacturing. The method comprises forming a protective silicon coating on selected surfaces of the carbon composite material to by forming a silicon bearing suspensoid coating on the surface of the carbon composite to be protected, and drying the suspensoid to a solid. In one embodiment, the suspensoid is formed by dissolving sodium silicate in water which is then mixed with an acid salt to form an irreversible gel. The suspensoid is either formed and then deposited on a surface area or formed in place through interactions between surface coatings of the separate compounds. The irreversible gel can be heated to remove the water and form a solid protective coating from the suspensoid.

16 Claims, 2 Drawing Sheets

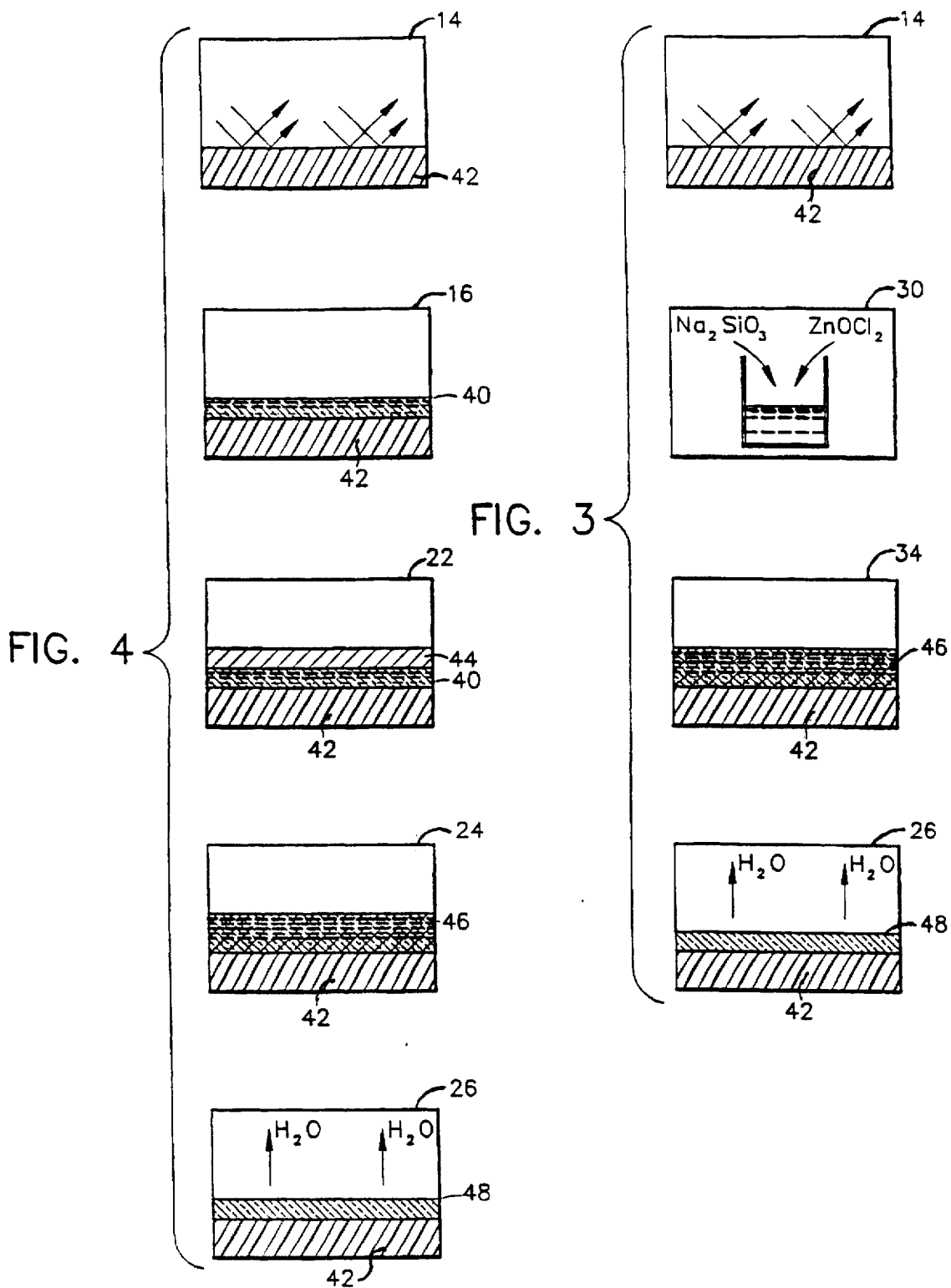

SURFACE PROTECTION FOR CARBON COMPOSITE MATERIALS

BACKGROUND OF THE INVENTION

1. Field of the Invention

The present invention relates to the manufacture of articles from carbonaceous materials and more particularly to a method of protecting carbon composite materials from surface and edge damage during handling and processing. The present invention further relates to a method of protecting carbon composite materials using a silicate suspensoid surface coating.

2. Background of the Art

Carbon-carbon composites, also known as graphite composites, are used in a variety of advanced technology applications including specialized parts such as fins and wing components for advanced aircraft and missiles. Carbon composite materials are lightweight and exhibit excellent strength and temperature characteristics, which are very desirable for high speed aerodynamic systems. However, carbon composite materials have several drawbacks that are manifested during processing, parts manufacture, and operational applications Some major areas of concern are material degradation from moisture absorption, oxidation at elevated temperatures, excessive damage from friction and handling, and a generally very brittle structure. The latter two problems stem from the porous nature of the surface of the composite material.

Carbon composites used in the aerospace arts generally comprise a graphite cloth, of loose fibers, which is impregnated with a resinous material or binder which is then heated under controlled conditions and decomposed or "carbonized". Additional impregnations with organic compounds which are again carbonized can also be used. Alternatively, a variety of graphite or carbonaceous fibers such as polyacrylonitrile or rayon, can be woven into a fabric or three dimensional array that is densified and bound together by impregnating or coating the structure with materials such as phenolic, furfuryl, or various pitch compositions which are subsequently carbonized.

The resulting carbon composite structures comprise denser fibers surrounded by a less dense carbon matrix which leads to a porous structure. The carbonaceous material in the the lower density regions also tends to bond poorly to the higher density fibers and may contain carbon in powder form which results in regions of flaking or dusting. When located along the outer surface these flaking regions can lead to pitting and surface irregularities.

Many advanced aerodynamic applications require parts having very fine or thin edges. Any dusting or pitting degrades the aerodynamic characteristics of such edges severely and, thus, the performance of such parts. Dusting also alters surface adhesion and porosity which affects surface coatings and chemical surface treatments often used in parts manufacture.

In addition, the general structure of carbon composite materials described above tends to be very brittle. This leads to at least two problems. First, edges are easily damaged by cracking or chipping during handling which also severely degrades part performance characteristics. Second, hardware or fasteners such as steel pads or bolts secured to carbon composite parts, such as by insertion in threaded holes, break loose under vibration.

Several techniques have been developed for reducing surface degradation resulting from moisture absorption and oxidation. Examples of such techniques and coatings are found in U.S. Pat. Nos. 4,022,585, 4,465,777, 4,471,023, and my co-pending patent application Ser. No. 813,899.

U.S. Pat. No. 4,465,777, discloses a technique for applying a 5 to 30 mil, thick protective coating comprising particulate silicon, silicon carbide, and boron. This coating inhibits oxidation of the carbon by forming a barrier between the composite surface and oxygen in the surrounding atmosphere. The impregnation and coating steps require complex curing steps and parts handling which must be accomplished very carefully to avoid damage.

U.S. Pat. No. 4,022,585, discloses a method for applying a protective metallic coating. In this method, an undercoat material deposited on the composite is flux coated with a fusible metal which is subsequently melted to create a protective coating.

U.S. Pat. No. 4,471,023, discloses a method of applying an enhancement coating for protecting a primary coating of silicon carbide. In this method, tetraethyl orthosilicate is deposited on the carbon composite in one or more impregnation and curing steps. The orthosilicate is then covered by a compound consisting of alkali silicate and particulate silicon carbide which, after heat curing, undergoes a heat treatment in an inert atmosphere. An enhancement coating is intended to provide surface protection for and seal microcracks forming in the primary coating. Again several complicated processing steps, each requiring parts handling, must be carried out.

These and other known coating techniques serve to reduce degradation due to oxidation and moisture absorption. However, they do not increase surface strength, improve bonding of the carbon matrix, or decrease brittleness. The techniques utilized often require complex processing steps and extensive parts handling to implement which can increase rather than decrease damage and are not very cost effective. Therefore, what is needed is an uncomplicated, cost effective, method for protecting carbon composite material surfaces during parts manufacture. The desired method of protection should improve the carbon matrix bonding, thus increasing surface strength or impact resistance, and decreasing brittleness but in a lightweight structure.

SUMMARY

With the above problems of the art in mind, it is one object of the present invention to provide a method of protecting exterior surfaces of porous carbon composite materials from damage.

It is a purpose of the present invention to provide a cost efficient method of protecting edge surfaces of carbon composite materials that increases surface integrity and decreases damage.

It is another purpose of the present invention to increase the bonding of carbon and carbonaceous materials to fibers in carbon composite structures.

It is an advantage of the present invention that the brittleness of the carbon composite structure is reduced.

It is another advantage of the present invention that it provides an uncomplicated process for increasing the surface strength of carbon composites while maintaining a low weight.

It is yet another purpose of the present invention to provide a method of protecting surfaces of carbon composite materials that does not increase the overall density of the material.

These and other objects, purposes, and advantages are realized in a method of protecting surfaces of porous carbon composite materials that comprises the steps of forming a sodium silicate suspensoid coating on the surface of the carbon composite to be protected, and drying the suspensoid to a solid. An exemplary suspensoid is formed by dissolving sodium tetrasilicate in an acid salt such as, but not limited to, zirconyl chloride or hydrogen carbonate. The suspensoid is deposited on the surface of the carbon composite to be protected and the water and other fluid components removed to form a protective coating or shell. A preferred method of removing the water comprises the step of heating the composite surface after coating so as to form a solid protective coating from said suspensoid.

In a further aspect of the present invention, the method of forming a sodium silicate suspensoid comprises the steps of first dissolving sodium tetrasilicate in water to form a highly concentrated basic solution capable of wetting the surface of the composite and then depositing a layer of said dissolved sodium tetrasilicate and water solution over the surface of the composite to be protected. A thin layer of an acid salt such as, but not limited to, hydrogen carbonate or zirconyl chloride is then deposited over the composite surface and sodium silicate and water layer so as to form an irreversible gel with dissolved sodium tetrasilicate. The irreversible gel is then heated to form a dried surface coating of sodium silicate.

BRIEF DESCRIPTION OF THE DRAWINGS

The novel features of the present invention may be better understood from the accompanying description when taken in conjunction with the accompanying drawing in which:

FIG. 3 illustrates a cross sectional representation of a portion of a carbon composite surface during the process steps of of FIG. 1; and FIG. 4 illustrates a cross sectional representation of a portion of a carbon composite surface during the process steps of of FIG. 2.

DETAILED DESCRIPTION OF A PREFERRED EMBODIMENT

The present invention comprises a method for protecting porous carbon composite materials from edge or surface damage during handling and manufacturing. The method of protection comprises forming a substantially chemically inert protective silicon coating on selected surfaces of the carbon composite material to be protected. In the preferred embodiment, this is accomplished by forming a silicon bearing suspensoid coating on the surface of the carbon composite to be protected, and drying the suspensoid to a solid. An exemplary suspensoid is formed by dissolving sodium silicate in an acid salt to form an irreversible gel. The suspensoid is either formed and then deposited on a surface area to be protected or formed in place through interactions between surface coatings of the separate compounds. A preferred method of removing the water and other fluid components to form a protective coating or shell comprises heating the composite surface after coating. Additional compounds can then be disposed on this primary coating where desired.

Figure 1:
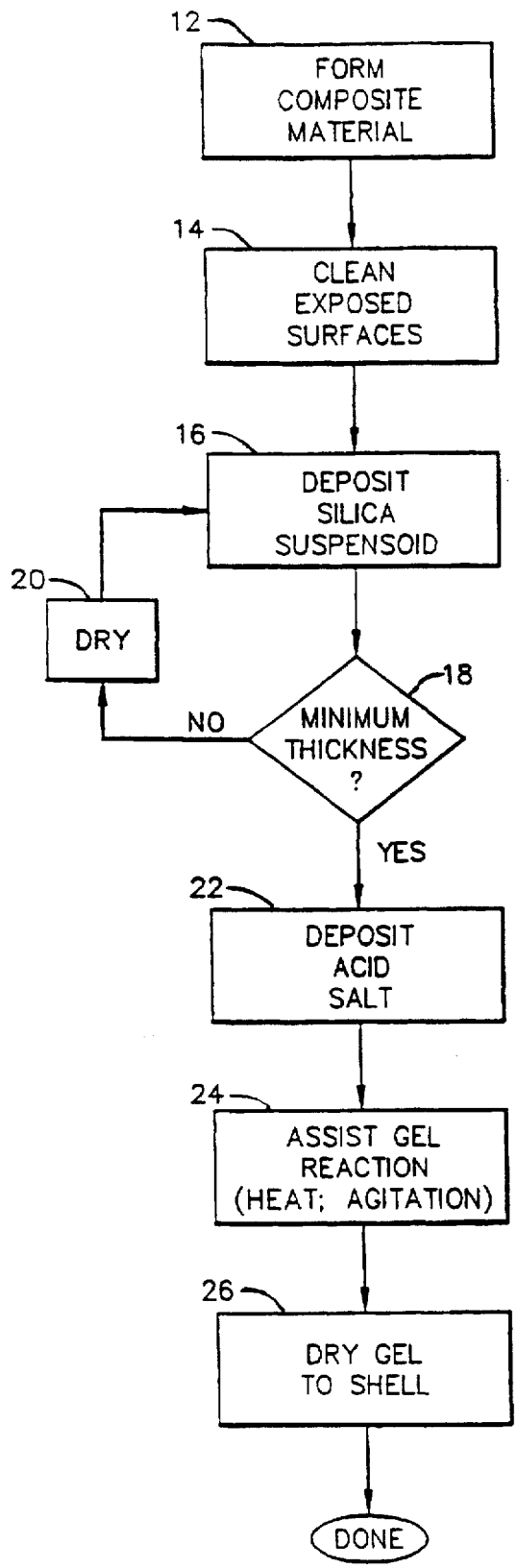
FIG. 1 illustrates the processing steps associated with the method of the present invention.

A method of protecting carbon composite material and parts formed therefrom, according to the principles of the present invention, is illustrated in the flow chart of FIG. 1. To aid in understanding the process (of the present invention a cross section of a representative carbon composite undergoing the method of FIG. 1 is illustrated in FIG. 3.

As shown in the process of FIGS. 1, a carbon composite material or part is first manufactured using the processes or techniques previously described and known to those skilled in the art. This is generally indicated as the step of formation 12 in FIG. 1.

The next step after the formation step 12 for any composite material surface coating or treatment process is typically a cleaning or degreasing step 14. It is well known in the art that the basic manufacturing process, as previously described, often leads to the presence of loose carbon dust, releasing agents, oily compounds from initial material handling, and other undesirable contaminants that inhibit a proper bond for any surface coatings. There are several methods known and used in the art for removing particulates and other contaminants from carbon composite materials including abrasion, chemical baths, and etching. The preferred technique is illustrated in FIGS. 3 and 4 as vapor blasting of the surface of the composite which does not leave a residue to interfere with the present process. The cleaning step is applied to improve the coating process as is well known in the art of carbon composite material manufacture. Therefore, the cleaning step is not a required integral part of the teachings of the present invention.

Once the surface of the carbon composite is cleaned or otherwise prepared, a silicon or silica coating 40 is formed on the surface, or surfaces, 42 of the composite to be protected in a coating step 16. To affect the coating step 16, a silicon or silica containing compound is formed into a suspension that can be evenly disposed on the composite material and which readily adheres to the surface unlike powder or particulate silicon or silicon carbide materials.

The preferred embodiment employs one of several soluble silicates as the silicon containing compound. Commercial silicates have the general formulation of:

$M_m SiO_2 nH_2O$ where M is an alkali metal, and m typically varies between 0.5–4.0.

While compounds such as potassium silicate (meta-$k_2SiO_3$, di-$K_2Si_2O_5$ or tetra-$K_2Si_4O_9$. $H_2O$), lithium silicate (meta-$Li_2SiO_3$) or magnesium silicate (meta-$MgSiO_3$) are available, sodium silicate (meta-$Na_2SiO_3$ or $Na_2SiO_3$. $9H_2O$, tetra-$Na_2Si_4O_9$, or sesqui-$Na_6Si_2O_7$) is the preferred compound due to its lower cost, ready availability and well understood chemistry.

Sodium silicate is also commonly referred to as sodium metasilicate, liquid glass, water glass and soluble glass. It represents a compound that dissolves in water to form a viscous alkaline solution and has been used as a binder and in adhesives. The greater the ratio of $Na_2O$ to $SiO_2$, the greater the alkalinity and the greater the adhesion of the compound to surfaces. The preferred embodiment utilizes sodium tetrasilicate which is available in a variety of grades and concentrations.

The sodium tetrasilicate is formed into a suspension or suspensoid using one of several techniques. The preferred embodiment employs the method of dissolving sodium tetrasilicate in water to form a highly concentrated basic solution capable of wetting the surface of the carbon composite. It is important that the suspensoid have this wetting property as carbon composites do not readily wet, which makes satisfactory application of most coatings very difficult.

The sodium silicate suspensoid is deposited or coated onto the carbon composite in step 16 using one of several techniques such as spraying, brushing, or dipping. The specific method of application is determined by several manufacturing requirements such as the size of the surface area to be protected, the size of the overall composite material or part to be coated, and limitations on the complexity of automatic machinery to be used for application. For small parts and minimum expense a hand brushing application technique is generally contemplated for the present inventive method.

The sodium silicate suspensoid is applied in the step 16 only to those portions of the carbon composite, such as edges, fastening points, and joints, where protection or strengthening is desired or needed. It is not necessary to coat the entire surface of a part or composite structure where damage from handling or processing is generally confined to limited areas.

The sodium silicate is painted on the surface 42 and allowed to dry as in a drying step 20. The sodium silicate solution may be applied in several, (two or three) successive layers or coats 40 to establish a predetermined thickness or in one single application. After each coat 40 a monitoring step 18 can be performed to verify the proper coating thickness and then the drying step 20 performed before subsequent layers 40 are applied to assure good adhesion and adequate moisture removal which assists in later processing.

The final thickness depends on the increase in weight or density that can be accommodated in the particular application versus the amount of silicon required by the specific porosity to increase the surface strength for given processing conditions.

The sodium silicate suspensoid undergoes a conversion step 22 where it is converted to an irreversible gel by the addition of an acid salt. An acid salt such as hydrogen carbonate ($H_2CO_3$) reacts with sodium silicate in a manner understood in the chemical arts to form an irreversible gel without requiring additional processing equipment or steps. In the present invention this is accomplished by coating the suspensoid layer 40 on the composite material surface with a thin layer 44 of an acid salt such as, but not limited to, zirconyl chloride ($ZnOCl_2.8H_2O$) or hydrogen carbonate. The acid salt can be applied by dipping the carbon composite material or as a surface 42 wash or by brushing over the material.

Acid salts are compounds known in the art and represented by formulas such as $MHCO_3$, and $MHSO_4$, where M represents hydrogen or a metal cation, having an acidic hydrogen available, and zirconyl chloride, also known as zirconium oxychloride, are known in the art to produce an acidic solution when dissolved in water. However, zirconium oxychloride reacts faster if isoproponyl is used or used or substituted for part of the water and wets the carbon composite more easily if it is applied first. Therefore, in preferred embodiments, the zirconium oxychloride is applied first and isoproponyl is employed.

Zirconium oxychloride is a preferred acid salt because it acts as a strong adhesive or high temperature cement bonding the carbon and fibers together and filling in the pores in the carbon matrix to hold the porous carbon structure together. Filing the pores with a high temperature, low density, inorganic material before plating improves resistance to impact damage by increasing the surface strength and decreasing brittleness of the composite structure.

If it is desirable to accelerate the gelling process or improve the interaction between the two adjacent chemical layers, an assistance step 24 can be implemented by applying gentle heat to slightly elevate the temperature of the coatings 40 and 44, or a slight agitation of the material or similar technique may be used. Those skilled in the art of chemical processing will also readily understand that additional chemicals, agents, or compounds not described herein, may be employed in the coatings 40 and 44 to reduce surface tension or other impairments to the admixture or interaction of the two surface layers or to add other features to the coatings.

Figure 2:
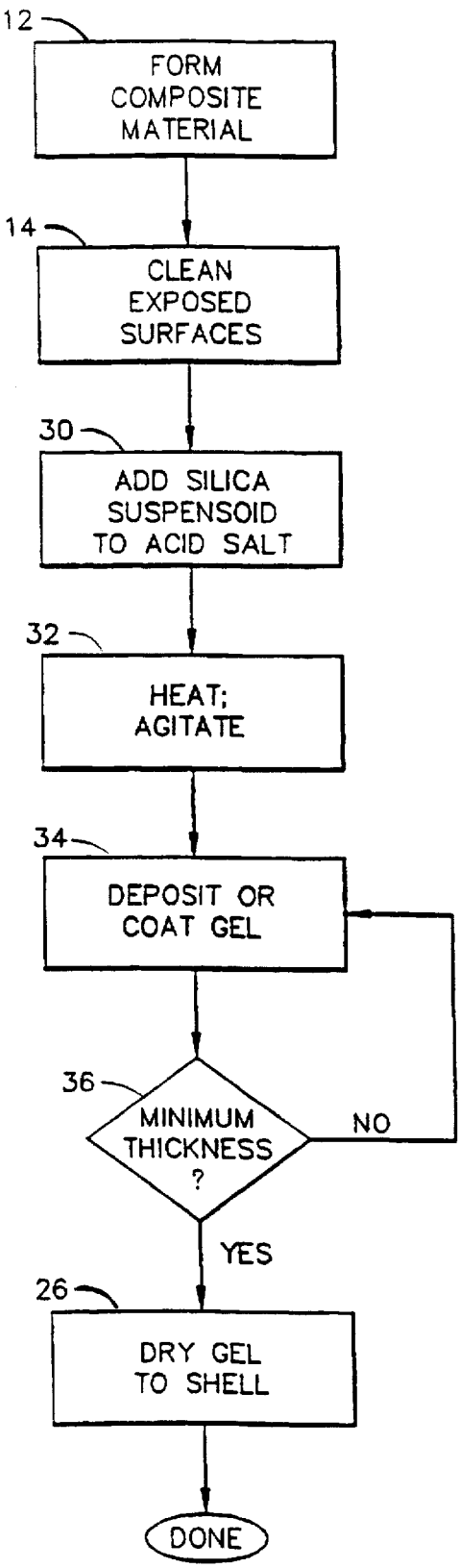
FIG. 2 illustrates alternative processing steps associated with the method of the present invention.

In the alternative, the sodium silicate suspensoid can be combined with an acid salt, such as zirconyl chloride, prior to application to the carbon composite surface. This is shown in FIGS. 2 and 4 as the combination step 30 where the separate components for forming the irreversible gel are combined. This allows the process to more completely intermix the two materials and assure a more uniform reaction and gel material. However, this process also makes it more difficult to apply the resultant reactant which is now a more viscous gel 46 which does not lend itself to some types of automatic application equipment such as spraying.

As before, heat or agitation can be applied in an assistance step 32. The irreversible gel 46 is then applied to the carbon composite in a coating step 34. The gel can be applied in several successive layers or coats to establish a predetermined thickness or in one single application. After each coat a monitoring step 36 can be performed to verify the proper coating thickness.

Once the irreversible gel 46 has been formed on the composite surface to be protected, either through coating interaction, as in step 26, or direct application, as in step 34, the gel 46 is converted to a hard protective surface coating 48 by removing the water or other fluid elements. The preferred embodiment contemplates a drying step 26 in which a heat source is used to drive off water through evaporation. This can be accomplished during material or parts processing using a directed source of hot air, a heat tunnel or an infrared heat source which directs heat to the general surface area 42 which is coated with the gel 46. It is also possible to remove the water using other techniques such as vacuum or cryogenic pumping or simple air drying. However, other techniques tend to be more complex and costly compared to the provision of a simple heat source.

Once a substantial percentage of the water and other fluids have been removed from the gel 46 in the step 26 and a surface coating 48 formed, any source of heat is removed and the composite surface allowed to dry further unassisted. If desired the composite part or surface area 42 having the coating 48 can be baked at an elevated temperature to form an exemplary hard surface coating.

The coating 48 that is formed is a very strong surface coating that resists or substantially prevents surface dusting, flaking, or pitting and inhibits cracking and other edge damage associated with parts handling. The resultant coating is also substantially chemically inert and lends itself to being further coated by other materials where conductive metal coatings and the like are desired for the final parts surface.

The surface coating 48 increases the density of the carbon composite material near the surface without substantially increasing the overall material density or weight. The surface strength is increased or improved and the brittleness correspondingly decreased. What has been described then is a new method of coating the surface of a porous carbonaceous material which protects that surface from the deleterious effects of handling.

The foregoing description of a preferred embodiments have been presented for purposes of illustration and description. They are not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim is:

1. A method of protecting a surface of a carbon composite material, comprising the steps of:

forming a silicon bearing suspensoid by reacting a metallic silicate and an acid salt;

coating said surface of the carbon composite with said suspensoid; and drying said suspensoid to a solid.

2. The method of claim 1 further comprising the step of heating said surface after said step of coating so as to form a solid protective coating from said suspensoid.

3. The method of claim 1 further comprising the step of heating said suspensoid after said step of coating so as to form a solid protective coating from said suspensoid.

4. The method of claim 1 wherein said step of forming said silicon bearing suspensoid comprises the step of dissolving a metallic silicate compound in an acid salt.

5. The method of claim 4 wherein said acid salt comprises a compound chosen from the group of zirconyl oxychloride and hydrogen carbonate.

6. The method of claim 1 wherein said step of forming said silicon bearing suspensoid, comprises:

dissolving a metallic silicate compound in water to form a highly concentrated basic solution capable of wetting the surface of said composite;

depositing a layer of said dissolved metallic silicate and water solution over said surface of said composite; and depositing a thin layer of an acid salt over said surface so as to form an irreversible gel with said dissolved metallic silicate compound.

7. The method of claim 6 wherein said step of dissolving a sodium silicate compound in water comprises the step of dissolving a silicate compound chosen from the group comprising sodium metasilicate, sodium tetrasilicate, sodium sesquisilicate, potassium metasilicate, potassium disilicate, potassium tetrasilicate, lithium metasilicate, and magnesium metasilicate.

8. The method of claim 6 wherein said acid salt comprises a compound chosen from the group of hydrogen carbonate and zirconyl chloride.

9. A method of protecting an exposed surface of a carbon composite structure, comprising the steps of:

forming a sodium silicate suspensoid by reacting sodium silicate and an acid salt;

coating the exposed surface of said carbon composite with said suspensoid; and drying said suspensoid to a solid.

10. The method of claim 9 further comprising the step of heating said composite after said step of coating so as to form a solid protective coating from said suspensoid.

11. The method of claim 9 further comprising the step of heating said exposed surface after said step of coating so as to form a solid protective coating from said suspensoid.

12. The method of claim 9 wherein said step of forming said sodium silicate suspensoid comprises the step of dissolving a sodium silicate compound in an acid salt.

13. The method of claim 12 wherein said acid salt comprises a compound chosen from the group of zirconyl chloride and hydrogen carbonate.

14. The method of claim 12 wherein said sodium silicate compound comprises a compound chosen from the group chosen from the group comprising sodium metasilicate, sodium tetrasilicate, and sodium sesquisilicate.

15. The method of claim 9 wherein said step of forming a sodium silicate suspensoid comprises the steps of:

dissolving sodium tetrasilicate in water to form a highly concentrated basic solution capable of wetting the surface of said composite;

depositing a layer of said dissolved sodium tetrasilicate and water solution over said exterior surface of said porous composite; and depositing a thin layer of an acid salt over said dissolved sodium tetrasilicate.

16. The method of claim 15 wherein said acid salt comprises a compound chosen from the group of hydrogen carbonate and zirconyl chloride.

* * * * *